United States Patent
Shin

(10) Patent No.: US 11,904,894 B2
(45) Date of Patent: Feb. 20, 2024

(54) FIRE SPREADING PREVENTION SYSTEM FOR VEHICLES

(71) Applicants: Hyundai Motor Company, Seoul (KR); Kia Motors Corporation, Seoul (KR)

(72) Inventor: Hyeon Gi Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 545 days.

(21) Appl. No.: 17/107,240

(22) Filed: Nov. 30, 2020

(65) Prior Publication Data

US 2022/0009519 A1  Jan. 13, 2022

(30) Foreign Application Priority Data

Jul. 8, 2020 (KR) .................. 10-2020-0083819

(51) Int. Cl.
*B60W 60/00* (2020.01)
*B60L 58/10* (2019.01)
(Continued)

(52) U.S. Cl.
CPC ........... *B60W 60/0015* (2020.02); *A62C 3/07* (2013.01); *B60L 50/64* (2019.02); *B60L 53/80* (2019.02);
(Continued)

(58) Field of Classification Search
CPC ..... B60W 60/0015; B60L 50/64; B60L 58/10; B60L 53/80; H01M 50/249
See application file for complete search history.

(56) References Cited

U.S. PATENT DOCUMENTS

2016/0279453 A1  9/2016 Ernfjall
2016/0327151 A1* 11/2016 Backes .................. F16H 59/44
(Continued)

FOREIGN PATENT DOCUMENTS

CN  109917787 A  *  6/2019
CN  110116697 A  *  8/2019  .............. B60L 58/00
(Continued)

OTHER PUBLICATIONS

Translation of CN-109917787-A.*
(Continued)

*Primary Examiner* — Geepy Pe
*Assistant Examiner* — Ashby A Walls
(74) *Attorney, Agent, or Firm* — Fox Rothschild LLP

(57) ABSTRACT

A fire spreading prevention system for a vehicle can prevent a fire breaking out in a battery mounted in the vehicle from spreading throughout the vehicle. The fire spreading prevention system includes a battery state detector that detects battery state information for sensing a battery fire in the vehicle; a controller that outputs a control signal for removing a battery upon determining that the battery fire breaks out; and a battery removal apparatus installed in the vehicle to fix the battery to a vehicle body, and configured to release the battery from the vehicle body and simultaneously to remove the battery from the vehicle in response to the control signal from the controller. When a fire is sensed, the fire spreading prevention system removes the battery from the vehicle and separates and discharges the battery to outside of the vehicle, thereby preventing the fire from spreading throughout the vehicle.

17 Claims, 11 Drawing Sheets

(51) Int. Cl.
    *B60L 50/64*           (2019.01)
    *G01C 21/34*          (2006.01)
    *B60W 10/08*          (2006.01)
    *B60W 10/26*          (2006.01)
    *B60W 40/06*          (2012.01)
    *A62C 3/07*            (2006.01)
    *H01M 10/0525*       (2010.01)
    *H01M 10/48*          (2006.01)
    *H01M 50/249*        (2021.01)
    *H01M 50/264*        (2021.01)
    *B60L 53/80*          (2019.01)

(52) U.S. Cl.
    CPC ............ *B60L 58/10* (2019.02); *B60W 10/08* (2013.01); *B60W 10/26* (2013.01); *B60W 40/06* (2013.01); *G01C 21/3461* (2013.01); *H01M 10/0525* (2013.01); *H01M 10/482* (2013.01); *H01M 10/486* (2013.01); *H01M 50/249* (2021.01); *H01M 50/264* (2021.01); *B60L 2240/545* (2013.01); *B60W 2420/42* (2013.01); *B60W 2510/246* (2013.01); *B60W 2552/05* (2020.02); *B60W 2552/10* (2020.02); *H01M 2200/10* (2013.01); *H01M 2220/20* (2013.01)

(56) References Cited

U.S. PATENT DOCUMENTS

| | | | | |
|---|---|---|---|---|
| 2017/0324122 | A1* | 11/2017 | Poirier | H01M 50/44 |
| 2018/0120837 | A1* | 5/2018 | Regmi | A61B 5/01 |
| 2018/0294064 | A1* | 10/2018 | Downey | E21B 49/00 |
| 2018/0339708 | A1* | 11/2018 | Geller | B60L 3/0015 |
| 2018/0356241 | A1* | 12/2018 | Correnti | G08B 7/066 |
| 2019/0012636 | A1* | 1/2019 | Simon | G08G 1/202 |
| 2020/0164771 | A1* | 5/2020 | Unnervik | B60N 2/42745 |

FOREIGN PATENT DOCUMENTS

| | | | | | |
|---|---|---|---|---|---|
| EP | 3666437 | A1 | * | 6/2020 | ......... B23B 31/102 |
| GB | 2537859 | A | * | 11/2016 | ............ B60K 1/04 |
| JP | 2002-240654 | A | | 8/2002 | |
| JP | 2019-187039 | A | | 10/2019 | |
| KR | 101424704 | B1 | | 7/2014 | |
| KR | 20200000182 | A | * | 6/2018 | ......... G01R 31/387 |
| WO | 2011-123808 | A2 | | 10/2011 | |
| WO | WO-2016017272 | A1 | * | 2/2016 | ............ B60R 11/04 |

OTHER PUBLICATIONS

Translation of EP-3666437-A1.*
Translation of CN-110116697-A.*
Translation of KR-20200000182-A.*
Translation of WO-2016017272-A1.*

* cited by examiner

FIRE SPREADING PREVENTION SYSTEM FOR VEHICLES

CROSS-REFERENCE TO RELATED APPLICATION

This application claims under 35 U.S.C. § 119(a) the benefit of Korean Patent Application No. 10-2020-0083819 filed on Jul. 8, 2020, the entire contents of which are incorporated herein by reference.

BACKGROUND

(a) Technical Field

The present disclosure relates to a fire spreading prevention system for vehicles, more particularly, to the fire spreading prevention system which can prevent a fire breaking out in a battery mounted in a vehicle from spreading throughout the vehicle.

(b) Background Art

Today, due to international environmental regulations, environmentally friendly vehicles driven using motors are being widely propagated.

Environmentally friendly vehicles include hybrid electric vehicles (HEVs), battery electric vehicles (BEVs), fuel cell electric vehicles (FCEVs), etc.

Among hybrid electric vehicles HEVs, a plug-in HEV is well known, and the plug-in HEV and a battery electric vehicle (BEV) are electric vehicles in which batteries are charged by power supplied from the outside.

These environmentally friendly vehicles have common characteristics in that a motor is used as a driving device for driving each vehicle, and a battery configured to provide power to the motor is also provided.

If fire breaks out in the battery of an environmentally friendly vehicle, the fire may spread within a short time due to structures and components of the battery, and it is difficult for a conventional fire extinguishing apparatus used in an internal combustion engine vehicle to extinguish the fire caused by the battery of the environmentally friendly vehicle.

Hereinafter, a conventional fire response method in an internal combustion engine vehicle will be briefly described. In the internal combustion engine vehicle, because fuel, which is a flammable material, is used, a plurality of heat sources is present, and various electric wires, which intersect each other in a complicated arrangement, are installed, there is a risk of fire.

For example, a high-temperature engine and various electric apparatuses, which are installed in an engine compartment, may be damaged or malfunction due to a vehicle crash, and may cause a fire.

In addition, there is a risk of fire in the engine compartment during driving due to overheating of the engine and an exhaust gas aftertreatment process.

The use of a fire extinguisher provided in the vehicle is widely known as a method for responding to a fire, and if a driver cannot use the fire extinguisher at the appropriate time, the driver fails to extinguish the fire at an early stage, and thus the fire may spread throughout the vehicle.

Further, public transportation vehicles, such as buses, which carry many passengers, essentially require fire prevention for passenger safety, and when an initial response to a fire fails, injuries or loss of life may result.

Moreover, a driver is present inside a vehicle during driving and thus has difficulty perceiving outbreak of a fire in an engine compartment before a significant amount of smoke is generated, and particularly, an engine compartment is located at the rear portion of a bus, unlike cars, and thus a bus driver has more difficulty perceiving outbreak of a fire in the engine compartment.

Therefore, when the driver fails to rapidly extinguish the fire at an early stage, the fire may spread, thereby causing complete combustion of the vehicle and increasing injuries or loss of life.

Further, even though the driver or passengers inside the vehicle rapidly perceive outbreak of the fire, they have difficulty rapidly extinguishing the fire at the early stage using only the small fire extinguisher provided in the vehicle.

Accordingly, a fire extinguishing system, which rapidly extinguishes a fire at an early stage by automatically spraying a fire extinguishing agent onto a point of ignition when outbreak of the fire in an engine compartment is sensed, is widely known.

In a known engine compartment fire extinguishing system, when a fire breaks out in an engine compartment, a fire sensing signal is transmitted and high-pressure nitrogen filling a nitrogen tank is supplied to a cylinder filled with a fire extinguishing agent through a hose.

Then, a piston is operated by the high-pressure nitrogen in the cylinder, and the fire extinguishing agent at a high pressure is supplied to a spray line by pushing force of the piston and sprayed onto a point of ignition through a nozzle of the spray line, thereby extinguishing the fire.

However, the above-described fire extinguishing system automatically sprays the fire extinguishing agent to the engine compartment or other spaces in the vehicle and is thus useful to extinguish the fire, but is not readily capable of extinguishing a fire breaking out in a battery of an environmentally friendly vehicle.

In general, it is known that, when a fire breaks out in a battery of an environmentally friendly vehicle, such as a lithium ion battery, it is almost impossible to extinguish the fire only by spraying water or a fire extinguishing agent.

Since combustible materials are present inside the closed inner space of a battery pack and materials having a large amount of oxygen are present within battery cells, when a fire breaks out in the battery pack, it is difficult to completely extinguish the fire due to residual oxygen in the battery pack even by spraying water or a fire extinguishing agent (e.g., a fire extinguishing powder or a fire extinguishing liquid) in the same manner as in the conventional internal combustion engine vehicles.

Therefore, the fire breaking out in the battery of the vehicle is not completely extinguished, and thus the fire may spread throughout the vehicle over time.

Recently, with increased use of environmentally friendly vehicles, the risk of fires due to application of external impacts, internal short circuits of the battery or high-voltage electric wiring around the battery has also increased.

However, technology that may prevent a fire breaking out in a battery from spreading throughout a vehicle has not been developed yet, and thus there are risks of complete combustion of the vehicle and loss of life.

The above information disclosed in this Background section is only for enhancement of understanding of the background of the disclosure and therefore it may contain information that does not form the prior art that is already known in this country to a person of ordinary skill in the art.

SUMMARY

The present disclosure provides a fire spreading prevention system for a vehicle which can prevent a fire breaking out in a battery mounted in the vehicle from spreading throughout the vehicle.

In one aspect, the present disclosure provides a fire spreading prevention system for a vehicle including a battery state detector configured to detect battery state information for sensing a battery fire in a vehicle, a controller configured to output a control signal for removing a battery upon determining that the battery fire breaks out using the battery state detector, and a battery removal apparatus installed in the vehicle to fix the battery to a vehicle body, and configured to release the battery from the vehicle body and simultaneously to remove the battery from the vehicle in response to the control signal from the controller so that the battery is separated and discharged to an outside of the vehicle so as to be spatially separated from the vehicle.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
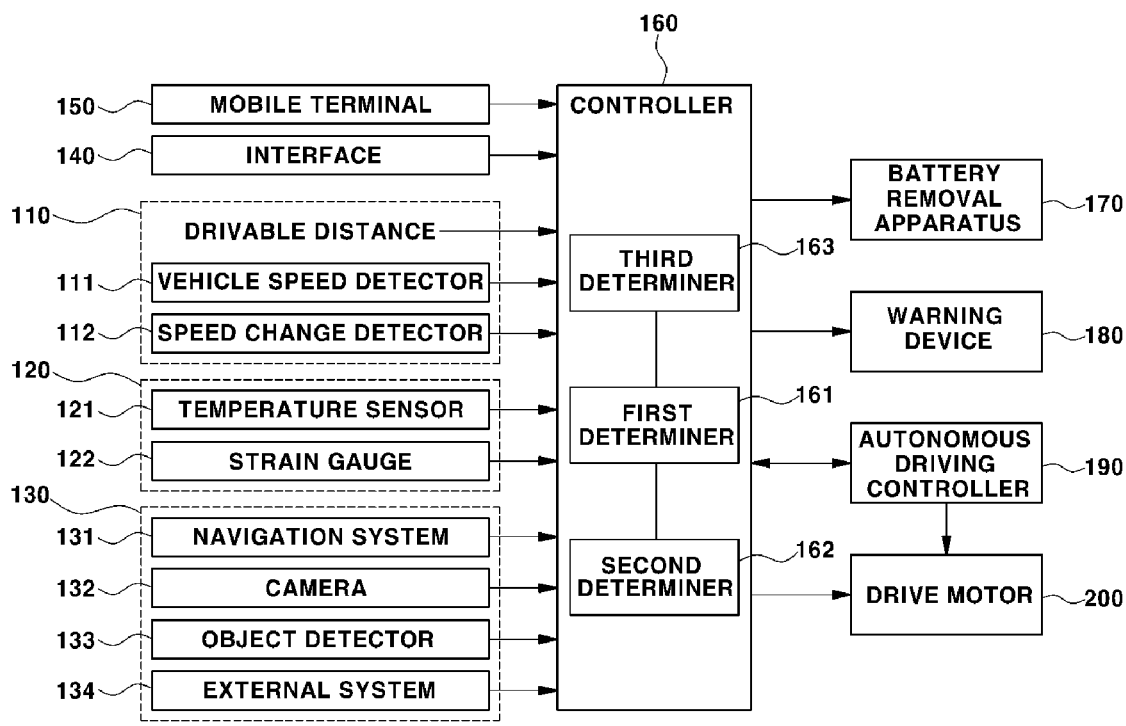
FIG. 1 is a block diagram illustrating a fire spreading prevention system for vehicles according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be within the spirit and scope of the disclosure as defined by the appended claims.

In the following description of the embodiments, it will be understood that, when a part "includes" an element, the part may further include other elements, and does not exclude the presence of other elements unless stated otherwise.

The present disclosure provides technology which may prevent a fire breaking out in a battery mounted in a vehicle from causing complete combustion of the vehicle or loss of life.

As described above, in a vehicle, particularly, an environmentally friendly vehicle in which a high-voltage battery is mounted, such as an electric vehicle, when a fire breaks out in the battery due to a collision or other reasons during driving, there is a limit to extinguishment of the fire by spraying a fire extinguishing agent to a point of ignition, i.e., the battery.

Measures to extinguish the fire of a lithium ion battery widely used as the high-voltage battery (main battery) of an environmentally friendly vehicle are vigorously being researched and developed at present, but no material for effectively suppressing explosion of the lithium ion battery and fire in the lithium ion battery has been found yet.

According to the results of study, it is difficult to find a material to effectively suppress explosion of the lithium ion battery and fire in the lithium ion battery among conventional fire extinguishing agents including fire extinguishing powders, gases and liquids, and it is now reported that all the conventional fire extinguishing agents have little effect on extinguishment of fires in lithium ion batteries.

Therefore, to prevent the fire from spreading throughout the vehicle, a method for separating the point of ignition from the vehicle may be considered.

That is, when a fire breaks out in the battery of the vehicle, the battery is removed from the vehicle, thus being completely separated and discharged from the vehicle.

When the battery and the vehicle are completely spatially separated from each other by discharging the battery, which is the point of ignition, from the vehicle, the fire breaking out in the battery may be prevented from spreading throughout the vehicle and the vehicle and a driver may be safely protected from the fire.

For this purpose, a fire spreading prevention system according to the present disclosure includes a battery removal apparatus configured to remove a battery from a vehicle so as to separate and discharge the battery from the vehicle when a fire breaks out in the battery. That is, the present disclosure discloses a system which is operated according to a driver manipulation under the control of a controller configured to sense a battery fire, releases mounting of a battery on a vehicle body, and removes the battery therefrom so as to separate and discharge the battery to the outside of the vehicle.

In the present disclosure, the battery, which is removed from the vehicle and discharged to the outside of the vehicle when a fire is sensed, may be a main battery, i.e., a high-voltage battery, of an environmentally friendly vehicle, and may be a battery pack or a battery module.

The present disclosure may be applied to environmentally friendly vehicles, and in particular, although the present disclosure is applicable to general cars, the present disclosure is usefully applicable to commercial vehicles, particularly, battery electric trucks, battery electric buses, and hydrogen electric trucks and hydrogen electric buses in which fuel cells are mounted.

In a truck or a bus, since the vehicle body thereof is large and thus a battery does not need to be mounted in the vehicle and may be mounted at a position of the vehicle body exposed to the outside, when the battery removal apparatus is applied thereto, the battery in which a fire breaks out may be removed from the vehicle and discharged to the outside.

Further, in a bus carrying a large number of passengers, since many lives may be lost if fire extinguishment at an early stage fails, when there is difficulty in extinguishing a fire at an early stage, it may be more effective in preventing a great tragedy to separate the battery from the bus so as to prevent the fire from spreading throughout the vehicle than to extinguish the fire in the battery.

That is, spatially complete separation of the battery, which may be the root causing a vehicle fire, from the vehicle, may firmly prevent a more dangerous situation, for example, complete combustion and loss of life.

On this point, in the present disclosure, when a fire breaks out in a main battery, i.e., a high-voltage battery of a vehicle, the fire in the high-voltage battery is sensed, the high-voltage battery is separated and discharged from the vehicle, and then the vehicle is moved to a safe place through limp-home driving using the power of a subsidiary battery (e.g., a separate battery which is not on fire), thereby preventing complete combustion of the vehicle and potential loss of life.

Hereinafter, the configuration of the fire spreading prevention system according to the present disclosure will be described in detail with reference to the accompanying drawings.

FIG. 1 is a block diagram illustrating the fire spreading prevention system for vehicles according to the present disclosure. As shown in FIG. 1, the fire spreading prevention system for vehicles includes a battery state detector 120 configured to detect battery state information for sensing a battery fire in a vehicle, a controller 160 configured to output a control signal for removing a battery upon determining that a battery fire breaks out using the battery state detector 120, and a battery removal apparatus 170 installed in the vehicle to fix the battery, mounted on a vehicle body, to the vehicle body, and operated to release the mounting and fixation of the battery on and to the vehicle body and to remove the battery from the vehicle in response to the control signal from the controller 160 so that the battery is separated and discharged to the outside of the vehicle so as to be spatially separated from the vehicle.

In addition, the fire spreading prevention system for vehicles may further include a driving information input unit 110 configured to detect or provide vehicle driving information, and a peripheral information input unit 120 configured to detect or provide information about the surroundings of the vehicle.

Here, the controller 160 determines whether or not the battery fire breaks out, whether or not a current vehicle position is a battery removal feasible place, and whether or not removal of the battery is feasible based on the vehicle driving information, the battery state information and the information about the surroundings of the vehicle, and outputs the control signal for removing the battery when the current vehicle position is a place where removal of the battery is feasible and the vehicle is in a state and in a situation in which removal of the battery is feasible, upon determining that the battery fire breaks out.

In addition, the fire spreading prevention system for vehicles may further include an interface 140 configured to allow a driver to input one selected from turning-on or turning-off of a battery removal function.

The interface 140 may employ any unit to allow the driver to turn on or off the battery removal function of the vehicle, and for example, may be an operating device including buttons or switches provided in the vehicle, an input device of an audio, video and navigation (AVN) system, a touchscreen, or the like.

The interface 140 may be connected to the controller 160, and when the driver inputs a turning-on or turning-off operation to the interface 140, the interface 140 may transmit a turning-on or turning-off operation signal to the controller 160.

In addition, the fire spreading prevention system for vehicles may further include a mobile terminal 150 configured to allow the driver to input one selected from turning-on or turning-off of the battery removal function.

The mobile terminal 150 may be a general mobile phone or smart phone, and be connected to the controller 160 of the vehicle through a communication apparatus of the vehicle capable of performing wireless communication, such as 5G, LTE, Wi-Fi, Bluetooth, or the like.

If the mobile terminal 150 is available, when a battery fire breaks out, the driver may turn on the battery removal function through the mobile terminal 150 under the condition that the driver escapes the vehicle.

Therefore, the driver may turn on or off the battery removal function through the interface 140 of the vehicle or the mobile terminal 150, which the driver carries, and when a battery fire breaks out, under the condition that the driver turns on the battery removal function, the controller 160 may receive an ON signal and output a control signal for removing the battery.

Accordingly, the battery removal apparatus 170 is operated in response to the control signal output from the controller 160, thereby being capable of removing the battery from the vehicle.

In addition, the fire spreading prevention system for vehicles may further include a warning device 180 operated in response to the control signal from the controller 160 which determines that a battery fire breaks out, so as to warn the driver of outbreak of the battery fire.

The warning device 180 may include a display configured to display the battery state information and battery fire outbreak information.

The display may be a display in a cluster of the vehicle, and when the controller 160 senses and determines that a battery fire breaks out, the controller 160 controls operation of the display so as to display outbreak of the battery fire.

According to one embodiment of the present disclosure, the display may be configured to display operation state information of the battery removal apparatus 170, or vehicle state information, such as vehicle movement information, after outbreak of the battery fire in response to a control signal from the controller 160.

Among the above elements, the controller 160 may be a vehicle control unit (VCU) which is an upper-level control unit configured to control the overall operation of the vehicle, or a fire control unit (FCU) which is a separate control unit configured to extinguish a fire breaking out in the vehicle, or a control unit including a plurality of controllers which are cooperatively operated to prevent a fire from spreading.

According to one embodiment of the present disclosure, the controller 160 may include a first determiner 161 configured to determine whether or not a battery fire breaks out, a second determiner 162 configured to determine whether or not a current vehicle position is a place where removal of the battery is feasible or to search for and determine a place where removal of the battery is feasible near the vehicle, and a third determiner 163 configured to determine whether or not removal of the battery is feasible.

The vehicle driving information may be information used by the controller 160 to determine whether or not removal of the battery is feasible, and include a current vehicle speed and vehicle transmission information.

Here, the driving information input unit 110 may include a vehicle speed detector 111 configured to detect the current vehicle speed, and a speed change detector 112 configured to detect the vehicle transmission information depending on operation of a transmission by the driver.

The vehicle speed detector 111 may include wheel speed sensors installed in vehicle wheels, and a method for acquiring vehicle speed information from the wheel speed sensors in real time is already known.

The transmission information may be information about transmission gear positions, i.e., information about gear positions P, R, N and D depending on driver's operation.

The real-time vehicle speed detected by the vehicle speed detector 111 and the transmission information detected by the speed change detector 112 are input to the controller 160, thus being used to determine whether or not removal of the battery is feasible.

For example, the controller 160 may be set to determine that removal of the battery is feasible when the vehicle speed falls within to a vehicle speed range that indicates a vehicle stopped state and the current gear position of a transmission is the gear position N or P.

Further, the vehicle driving information for determining whether or not removal of the battery is feasible may further include information about a drivable distance that the vehicle is capable of being driven using the power of the subsidiary battery which is not on fire.

That is to say, when a fire breaks out in at least one of a plurality of batteries mounted in the vehicle, a drivable distance that the vehicle is capable of being driven using the power of a battery which is not on fire may be used.

The drivable distance may be information calculated based on the state of charge of the subsidiary battery, and in particular, may be information calculated directly by the controller 160 based on state of charge information of the subsidiary battery provided by a battery management system (BMS, not shown), or information which the controller 160 receives from a battery control unit.

The battery state information may be information used by the controller 160 to determine whether or not a battery fire breaks out, and may include the temperature of the battery, i.e., the high-voltage battery which is the main battery, and the temperature of the battery may be the temperature of battery cells.

In addition, the battery state information may further include the strain rate information of the battery.

Here, the battery state detector 120 may include a temperature sensor 121 configured to detect the temperature (° C.) of the battery, and a strain gauge 122 configured to measure the strain rate (%) of the battery.

The strain rate of the battery indicates an amount of expansion of the battery cells and, to measure the strain rate indicating a degree of expansion of the battery cells, the strain gauge 122 may be adhered to the side surfaces of the battery cells.

When the temperature of the battery cells is raised before a fire breaks out, the battery cells expand. If whether or not a fire breaks out is determined using only the temperature of the battery cells, there is a possibility of erroneous determination due to an error in measurement, and thus when the strain rate of the battery indicating the degree of expansion of the battery cells is used together with the temperature of the battery, whether or not a fire breaks out may be accurately determined.

The controller 130 may acquire the battery state information directly by receiving signals from the temperature sensor 121 and the strain gauge 122, which are installed in the battery, or receive the battery state information from the battery control unit.

The peripheral information input unit 130 may serve to detect or provide information about the surroundings of the vehicle, and may include a camera 132 mounted in the vehicle and further include an object detector 133 mounted in the vehicle to detect objects near the vehicle.

Here, the camera 132 may include a plurality of cameras, such as a front camera, a rear camera, etc., so as to capture the entire periphery of the vehicle, and the object detector 133 may be a radar.

Further, the peripheral information input unit 130 may further include a navigation system 131 installed inside the vehicle, and an external system 134 located outside the vehicle so as to provide information about the surroundings of the vehicle.

The information about the surroundings of the vehicle may be information used by the controller 160 to search for and determine a place where removal of the battery is feasible near the vehicle or to determine whether or not removal of the battery is feasible, and include real-time vehicle position information, information about buildings and roads near the vehicle, and information about whether or not objects, such as other vehicles and persons, are present near the vehicle.

The navigation system 131 may provide vehicle position information acquired through a GPS receiver and the information about buildings and roads near the vehicle acquired from map information, and the camera 132 may provide an image near the vehicle and thus allow the controller 160 to acquire information about whether or not other vehicles and persons are present near the vehicle.

Further, the external system 134 located outside the vehicle may be an external system based on a connected car and V2X wireless vehicle communication technology, and V2X wireless vehicle communication may include vehicle-to-vehicle (V2V) communication and vehicle-to-infrastructure (V2I) communication.

In particular, the external system 134 located outside the vehicle may be a traffic information system, which is located outside the vehicle and is configured to wirelessly provide information about buildings and roads near the current vehicle position, information about peripheral vehicles, and traffic information.

The traffic information system may include information collection apparatuses, such as cameras and sensors, configured to collect real-time road information and vehicle information, and a server configured to collect information transmitted from the information collection apparatuses and then to provide the collected information to the vehicle, to which the present disclosure is applied, through wireless communication.

In addition, the traffic information system may include a vehicle communication system mounted in each of the vehicle, to which the present disclosure is applied, and other vehicles near the vehicle, to transceive various pieces of information necessary in the present disclosure through wireless communication between the vehicles.

According to one embodiment of the present disclosure, the controller 160 uses the information about the surroundings of the vehicle, input from the peripheral information input unit 130, to determine whether or not the current position of the vehicle is a place where removal of the battery is feasible, or to search for a place where removal of the battery is feasible near the vehicle.

In the configuration of the embodiment shown in FIG. 1, the first determiner 161 of the controller 160 determines whether or not a battery fire breaks out based on the battery state information input from the battery state detector 120.

Further, in the configuration of the embodiment shown in FIG. 1, the second determiner 162 of the controller 160 determines whether or not the current vehicle position is a place where removal of the battery is feasible based on the information about the surroundings of the vehicle input from the peripheral information input unit 130, and the third determiner 163 of the controller 160 determines whether or not removal of the battery is feasible based on the vehicle driving information input from the driving information input unit 110 and the information about the surroundings of the vehicle input from the peripheral information input unit 130.

According to one embodiment of the present disclosure, the controller 160 determines whether or not the current vehicle position is a place where removal of the battery is feasible upon determining that a battery fire breaks out, and determines whether or not removal of the battery is feasible upon determining that the current vehicle position is located in a place where removal of the battery is feasible.

Here, a process of determining whether or not the current vehicle position is a place where removal of the battery is feasible may include a process of determining whether or not the current vehicle position is a place where, once the battery that is on fire is removed from the vehicle and discharged to outside, the discharged battery puts peripheral vehicles and persons in danger or causes damage thereto.

In addition, the process of determining whether or not the current vehicle position is a place where removal of the battery is feasible may include a process of searching for and determining a place where removal of the battery is feasible near the vehicle.

According to one embodiment of the present disclosure, the controller 160 determines whether or not removal of the battery is feasible upon determining that the current vehicle position is a place where removal of the battery is feasible, and operates the battery removal apparatus 170 so as to remove and discharge the battery from the vehicle upon determining that the current vehicle position is in a state and in a situation in which removal of the battery is feasible.

On the other hand, upon determining that the current vehicle position is a place where removal of the battery is not feasible, the controller 160 searches for and determines a place where removal of the battery is feasible near the vehicle, and moves the vehicle to the determined place where removal of the battery is feasible by operating a drive motor 200 using the power of the subsidiary battery (or a separate battery) which is not on fire.

After moving the vehicle to the determined place where removal of the battery is feasible, the controller 160 determines whether or not removal of the battery is feasible, and operates the battery removal apparatus 170 so as to remove and discharge the battery from the vehicle upon determining that the vehicle in the state and in the situation in which removal of the battery is feasible.

Figure 2:
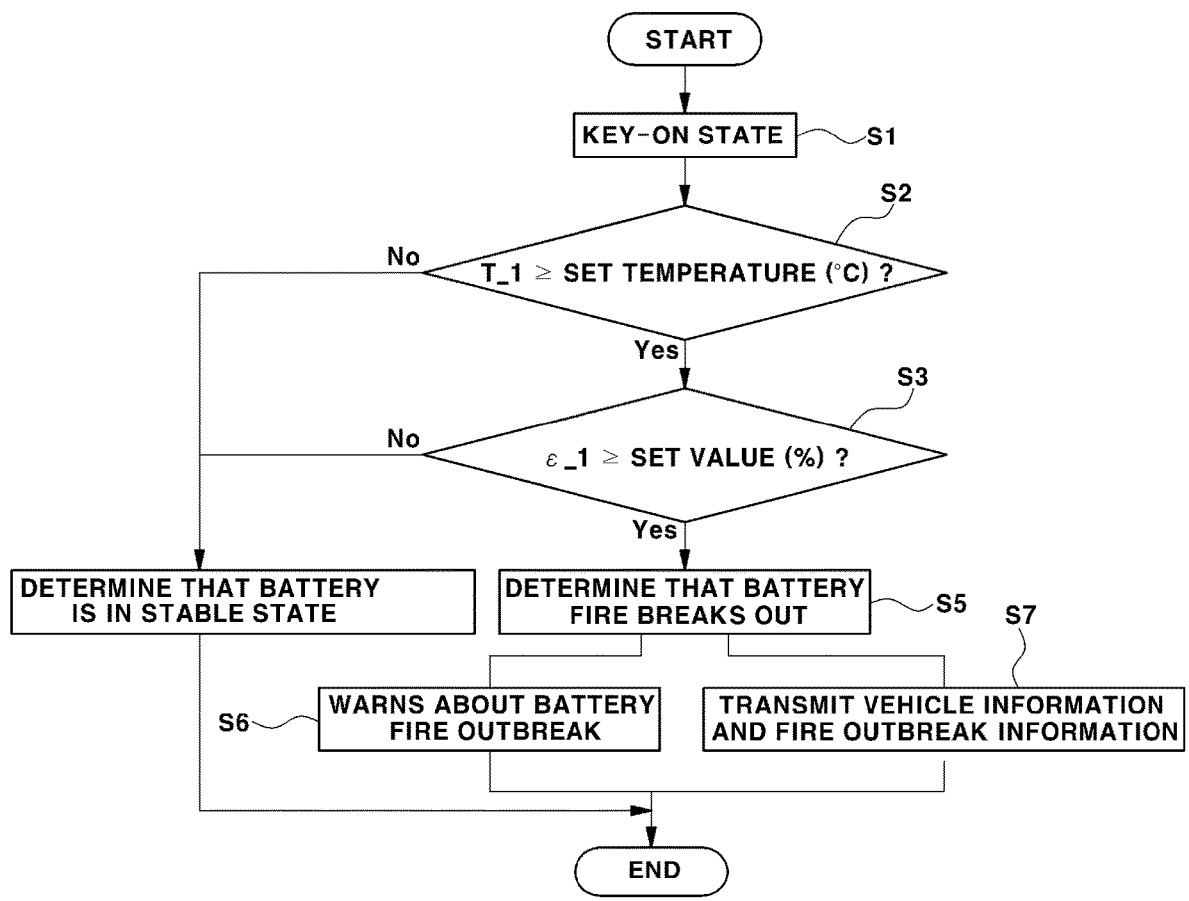
FIG. 2 is a flowchart showing a process of determining whether or not a battery fire breaks out according to the present disclosure.

FIG. 2 is a flowchart showing a process of determining whether or not a battery fire breaks out according to the present disclosure.

In the key-ON state of the vehicle (S1), the controller 160 receives the battery state information detected by the battery state detector 120, and determines whether or not a battery fire breaks out based on the received battery state information.

Here, when a battery temperature $T\_1$ detected by the temperature sensor 121 of the battery state detector 120 is equal to or higher than a set temperature (S2) and a strain rate $\varepsilon\_1$ measured by the strain gauge 122 is equal to or greater than a set value (S3), the controller 160 may determine that a battery fire breaks out (S5).

Upon determining that the battery fire breaks out, the controller 160 controls operation of the warning device 180, for example, operation of the display in the cluster so as to display a battery fire warning pop-up phrase, thereby warning the driver about outbreak of the battery fire (S6).

Further, the controller 160 may transmit vehicle information, including a vehicle position, and fire outbreak information (S7) to peripheral vehicles through an in-vehicle communication apparatus (not shown), and simultaneously transmit the same to a fire station close to the vehicle so as to automatically report outbreak of the battery fire and to allow fire engines to move to the position of the vehicle (i.e., a place where the battery is to be removed).

The transmission of the vehicle information and the fire outbreak information to the peripheral vehicles and the fire station so as to automatically report outbreak of the battery fire and to allow the fire engines to move to the position of the vehicle will be described in more detail below.

Figure 3:
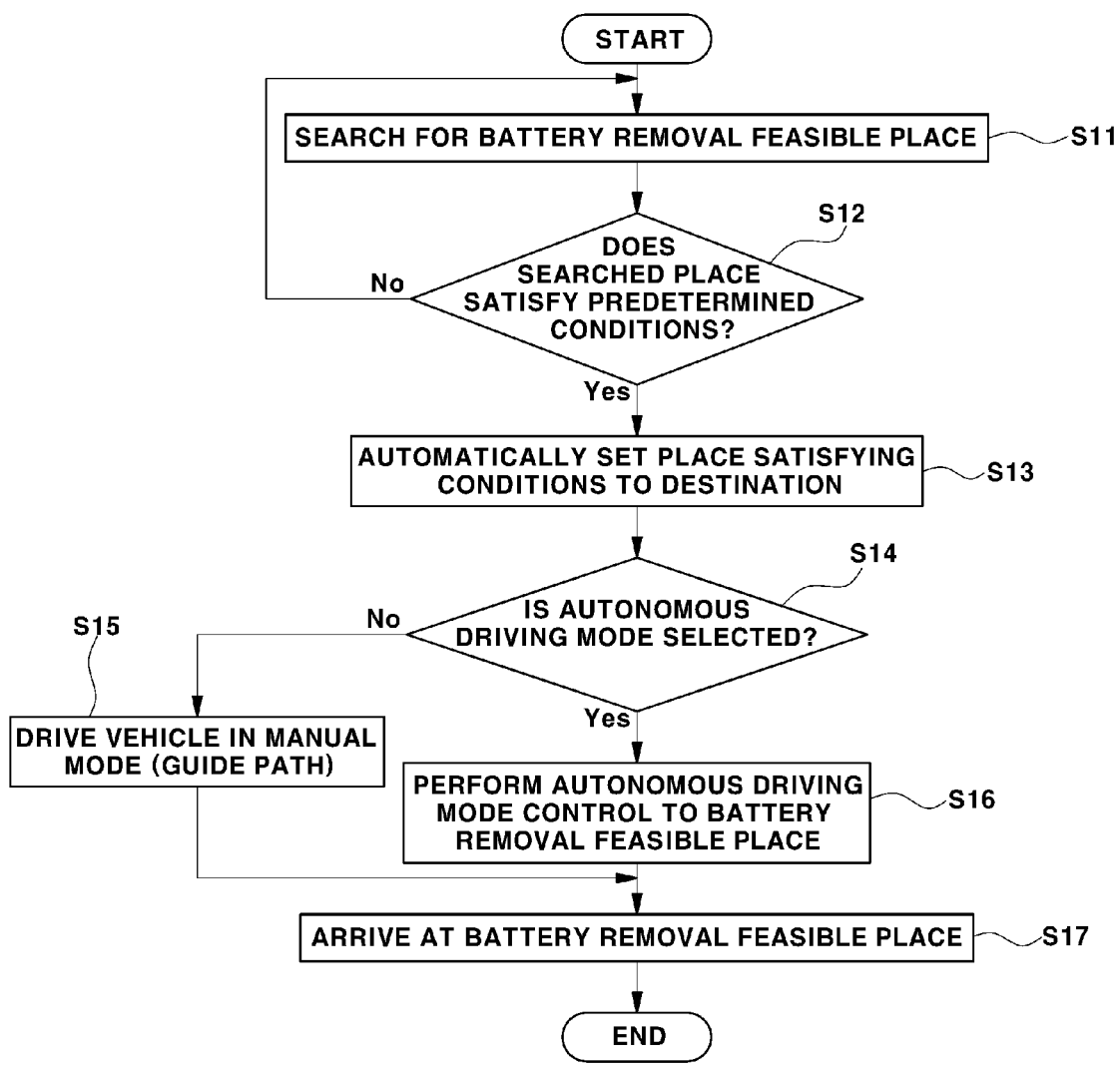
FIG. 3 is a flowchart showing a process of moving a vehicle to a place where removal of a battery is feasible so as to remove the battery after determination as to whether or not the battery fire breaks out.

FIG. 3 is a flowchart showing a process of moving the vehicle to a place where removal of the battery is feasible so as to remove the battery after the determination as to whether or not the battery fire breaks out.

As shown in FIG. 3, upon determining that the battery fire breaks out, the controller 10 searches for places where the battery can be safely removed from the vehicle and discharged to the outside using the information about the surroundings of the vehicle input by the peripheral information input unit 130, and determines a battery removal feasible place satisfying predetermined conditions based on search results (S11, S12).

Here, the predetermined conditions to determine the battery removal feasible place, referred to as "battery removal feasible place conditions" below, may include a condition in which the place corresponds to a side road or a vacant lot, and further include a condition in which the place does not belong to predetermined battery removal forbidden places.

Here, the battery removal forbidden places may include a child protection zone, an elderly protection zone, a two-lane road with one lane for each direction, an expressway service area, a rest area, an alleyway, a road having no lane and traffic signal information, or a residential area.

Thereafter, after determining the battery removal feasible place, the controller 160 automatically sets the determined battery removal feasible place to a destination through the navigation system 131 (S13), and searches for and sets a path to the destination through the navigation system 131.

Thereafter, the controller 160 confirms whether or not an autonomous driving mode is selected (S14), and performs autonomous driving control together with an autonomous driving controller 190 so as to move the vehicle to the destination through autonomous driving upon confirming that the autonomous driving mode is selected by the driver (S16).

On the other hand, when a manual mode is selected by the driver, the controller 160 guides the path to the destination through the navigation system 131 during driving so as to allow the driver to drive the vehicle to the destination.

Of course, when the driver finds out and recognizes a safe place prior to arrival at the destination and then operates a steering wheel even while driving in the autonomous driving mode, switching from the autonomous driving mode to the manual mode is performed and thus the driver may manually drive the vehicle (S15).

Further, when the vehicle moves to the battery removal feasible place (S17), the controller 160 may drive the drive motor 200 using the power of the subsidiary battery which is not on fire, because the fire breaks out in the high-voltage battery which is the main battery, and thereby the vehicle is driven in the limp-home mode using the power of the subsidiary battery.

Figure 4:
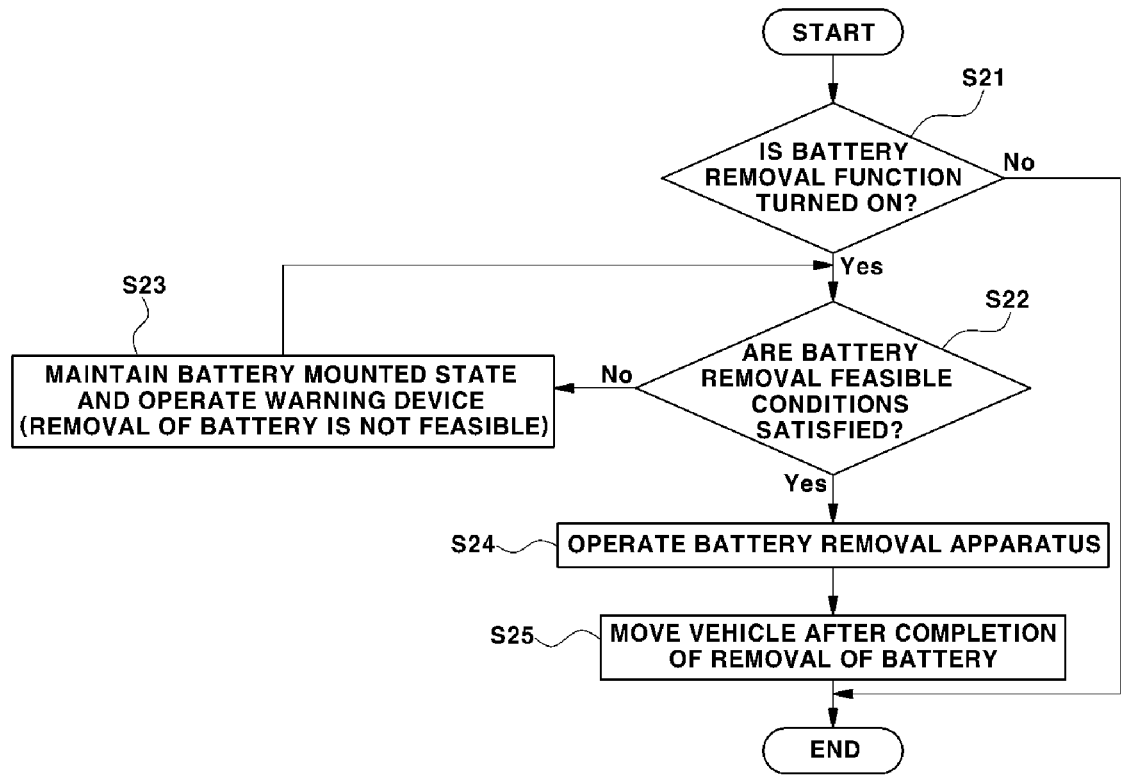
FIG. 4 is a flowchart showing a process of automatically removing the battery after determination as to whether or not removal of the battery is feasible.

Next, FIG. 4 is a flowchart showing a process of automatically removing the battery after determination as to whether or not removal of the battery is feasible.

First, when the vehicle is moved to the battery removal feasible place after outbreak of the battery fire, the controller 160 displays related information so that the driver may select one from turning-on and turning-off of the battery removal function.

Thereafter, the driver confirms whether or not the fire actually breaks out in the battery through a side mirror, etc., with the naked eye, and turns on the battery removal function through the interface 140 of the vehicle or the mobile terminal 150 upon confirming that the fire actually breaks out in the battery (S21).

Here, the driver may escape the vehicle, and then turn on the battery removal function by operating the mobile terminal 150.

Thereafter, the controller 160 performs a designated control process for automatically removing the battery. Here, the controller 160 first determines whether or not the vehicle is in a state and in a situation in which removal of the battery is feasible based on information collected by the vehicle.

In the determination as to whether or not removal of the battery is feasible, the vehicle driving information input from the driving information input unit 110 and the information about the surroundings of the vehicle input from the peripheral information input unit 130 may be used.

That is, the controller 160 determines whether or not predetermined battery removal feasible conditions are satisfied based on the vehicle driving information and the information about the surroundings of the vehicle (S22).

Here, the battery removal feasible conditions may include a condition in which no object, such as vehicle or person, is present within a designated distance near the current position of the vehicle.

Therefore, the controller 160 confirms whether or not a vehicle or a person is present within the designated distance near the current position of the vehicle using the front and rear cameras 132 and the object detector 133, i.e., the radar, of the peripheral information input unit 110, which are mounted on the vehicle.

Here, upon determining that an object, such as a vehicle or a person, is present within the designated distance, the controller 160 determines that the vehicle is in a situation in which removal of the battery is not feasible, and operates the warning device 180, such as the display in the cluster, so as to warn the driver that removal of the battery is not feasible at present (S23).

Further, the warning device 180 may include a sound output unit, such as a speaker, and, in this case, the controller 160 may operate the sound output unit so as to output an alarm so that persons or other vehicles near the vehicle keep a safe distance from the vehicle.

On the other hand, upon determining that an object, such as a vehicle or a person, is not present within the designated distance, the controller 160 may determine that the vehicle is in a situation in which removal of the battery is feasible.

According to one embodiment of the present disclosure, the battery removal feasible conditions may include a condition in which the vehicle is stopped and a condition in which the current gear position of the transmission is the gear position N or P.

Upon determining that no object is present within the designated distance, the controller 160 may determine whether or not the condition in which the vehicle is stopped is satisfied based on the current vehicle speed detected by the vehicle detector 111, determine whether or not the condition in which the current gear position of the transmission is the gear position N or P is satisfied based on the transmission information detected by the speed change detector 112, and determines that the vehicle is in a state in which removal of the battery is feasible when both of these conditions are satisfied.

In addition, the battery removal feasible conditions may further include a condition in which the drivable distance of the vehicle using the power of the subsidiary battery is equal to or great than a set distance.

That is, the controller 160 may determine that the vehicle is in the state in which removal of the battery is feasible when all of the condition in which an object is not present within the designated distance, the condition in which the vehicle is stopped, the condition in which the current gear position of the transmission is the gear position N or P, and the condition in which the drivable distance of the vehicle using the power of the subsidiary battery is equal to or great than the set distance are satisfied.

Further, the controller 160 may transmit a battery fire outbreak area, i.e., the current position of the vehicle, to the external system 134 located outside the vehicle, for example, other vehicles and the traffic information system, and simultaneously request the navigation systems 131 installed in other vehicles near the vehicle to display the battery fire outbreak area, through the communication apparatus of the vehicle.

Simultaneously, the controller 160 may automatically transmit vehicle information, including the current position of the vehicle, and fire outbreak information to a fire station through a communication network, such as 5G, LTE, Wi-Fi, or the like, thereby being capable of reporting outbreak of the battery fire to the fire station.

Then, the fire station may transmit vehicle position information to fire engines close to the current position of the vehicle so that the fire engines may rapidly move to the battery fire outbreak area.

At the same time, the controller 160 may operate the battery removal apparatus 170 to release the mounted and fixed state of the battery on and to the vehicle body and to remove the battery from the vehicle, so that the battery is separated and discharged to the outside of the vehicle (S24).

Thereafter, when separation of the battery from the vehicle and discharge of the battery to the outside of the vehicle have been completed, the controller 160 moves the vehicle away from the battery removal place. Here, the controller 160 moves the vehicle in the autonomous driving mode or the manual mode to a safe place, which is spaced apart from the battery removal place by a predetermined distance or more.

At this time, the controller 160 controls the vehicle in the limp-home mode so that the vehicle is driven using the power of the subsidiary battery which is not on fire.

Although the above description shows that, when a fire breaks out in the high-voltage battery, the vehicle is driven using the power of the subsidiary battery, if the high-voltage battery includes a plurality of battery packs or battery modules, the above-described subsidiary battery may be replaced by a battery pack or a battery module which is not on fire, among the battery packs or the battery modules.

Here, the above-described drivable distance may be replaced by a drivable distance of the vehicle using the power of the battery pack or the battery module which is not on fire.

For example, when a fire breaks out in one of two battery modules mounted in the vehicle, i.e., a first battery module, a drivable distance of the vehicle using the power of the remaining one, i.e., a second battery module, is calculated.

Further, the controller 160 determines whether or not the battery removal feasible conditions are satisfied based on the drivable distance, and operates the drive motor 200 using the power of the second battery module to move the vehicle after the battery is removed, separated from the vehicle and discharged to the outside of the vehicle.

Figure 5:
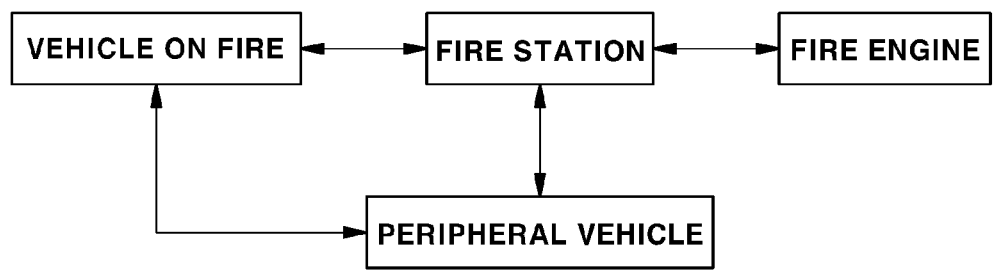
FIG. 5 is a block diagram illustrating a state in which a vehicle to which the present disclosure is applied, a peripheral vehicle, a fire station and a fire engine communicate with each other.

FIG. 5 is a block diagram illustrating a state in which the vehicle to which the present disclosure is applied, a peripheral vehicle, a fire station and a fire engine communicate with each other. When the vehicle in which a battery fire breaks out reaches a battery removal feasible place, the controller 160 of the vehicle selects a fire station closest to the current position of the vehicle based on fire station search information provided by the navigation system 131.

Thereafter, the controller 160 transmits vehicle information, including the current position of the vehicle in which the battery fire breaks out, and fire outbreak information to the selected fire station through a communication network, such as 5G, LTE, Wi-Fi, or the like, and reports outbreak of the battery fire to the fire station.

Further, the controller 160 transmits the vehicle information, including the current position of the vehicle in which the battery fire breaks out, and the fire outbreak information to all peripheral vehicles located within the predetermined distance from the current position of the vehicle, thereby allowing the respective peripheral vehicles to escape a battery fire outbreak area.

Here, the fire station transmits the vehicle information, including the current position of the vehicle in which the battery fire breaks out, and the fire outbreak information to a fire engine closest to the battery fire outbreak area through the wireless communication network, requests the fire engine to extinguish the battery fire, and transmits a path to the battery fire outbreak area to the fire engine.

Further, the fire station transmits information, such as the position of the fire engine which is to be dispatched to the battery fire outbreak area, the moving path of the fire engine to the battery fire outbreak area, information about whether or not roads near the battery fire outbreak area are available, etc., to the peripheral vehicles near the vehicle, and, after the fire engine is called to the battery fire outbreak area and extinguishes the battery fire, the fire station notifies the peripheral vehicles of completion of extinguishment of the battery fire.

As such, when the vehicle in which the battery fire breaks out arrives at the battery removal feasible place, the vehicle, other peripheral vehicles near the vehicle, the fire station and the fire engine may communicate with each other so as to rapidly extinguish the battery fire.

Hereinafter, the battery removal apparatus 170 will be described in more detail.

In the present disclosure, to remove the battery from the vehicle and then to separate and discharge the battery to the outside of the vehicle does not merely mean to release the fixed state of the battery to the vehicle body.

That is, in the present disclosure, to remove the battery from the vehicle and then to separate and discharge the battery to the outside of the vehicle means to release the state in which the battery is mounted on and fixed to the vehicle body and thereafter to discharge the battery from the vehicle to the ground so that the vehicle and the battery are completely spatially separated from each other.

Figure 6:
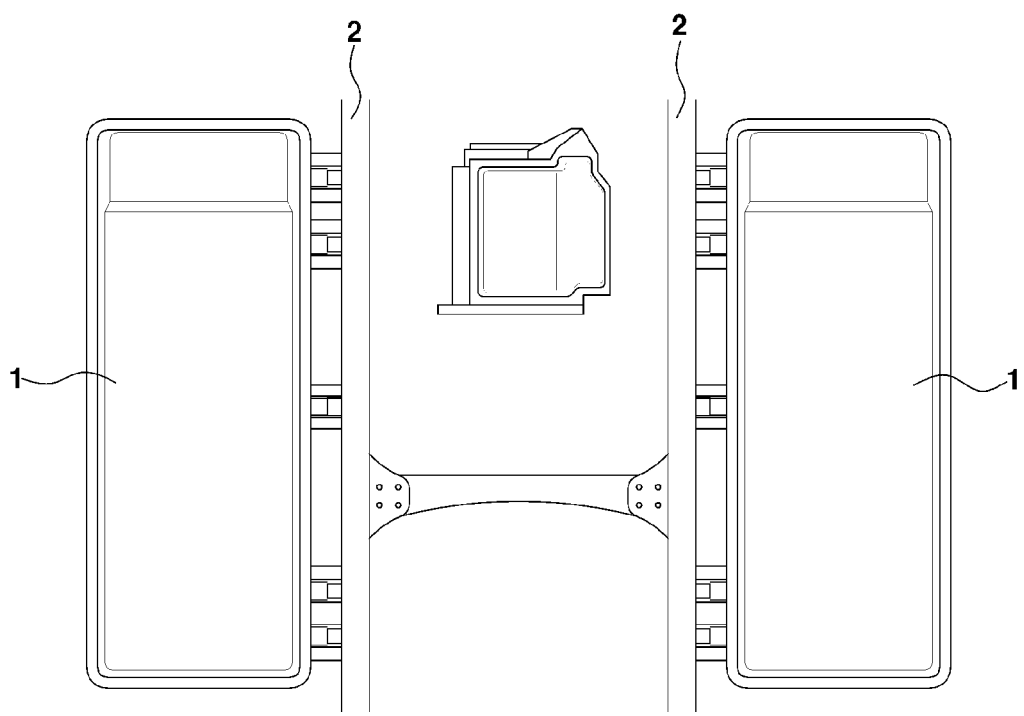
FIG. 6 is a plan view illustrating a state in which battery modules are mounted on vehicle body frames in the vehicle to which the present disclosure is applied.

FIG. 6 is a plan view illustrating a state in which battery modules are mounted on vehicle body frames in the vehicle to which the present disclosure is applied, and the battery modules 1 may be mounted on two vehicle body frames, i.e., left and right vehicle body frames 2 arranged parallel to each other in the forward and rearward directions of the vehicle.

Here, a total of two battery modules 1 may be mounted in the vehicle, i.e., one battery module 1 may be mounted on each of the two vehicle body frames 2, and each battery module 1 is mounted on the corresponding vehicle body frame 2 so as to be fixedly supported by a mounting structure.

Referring to FIG. 6, each battery module 1 is mounted so as to be disposed on the outer side part of the vehicle body frame 2.

Hereinafter, "battery module" will be abbreviated as "battery".

Figure 7:
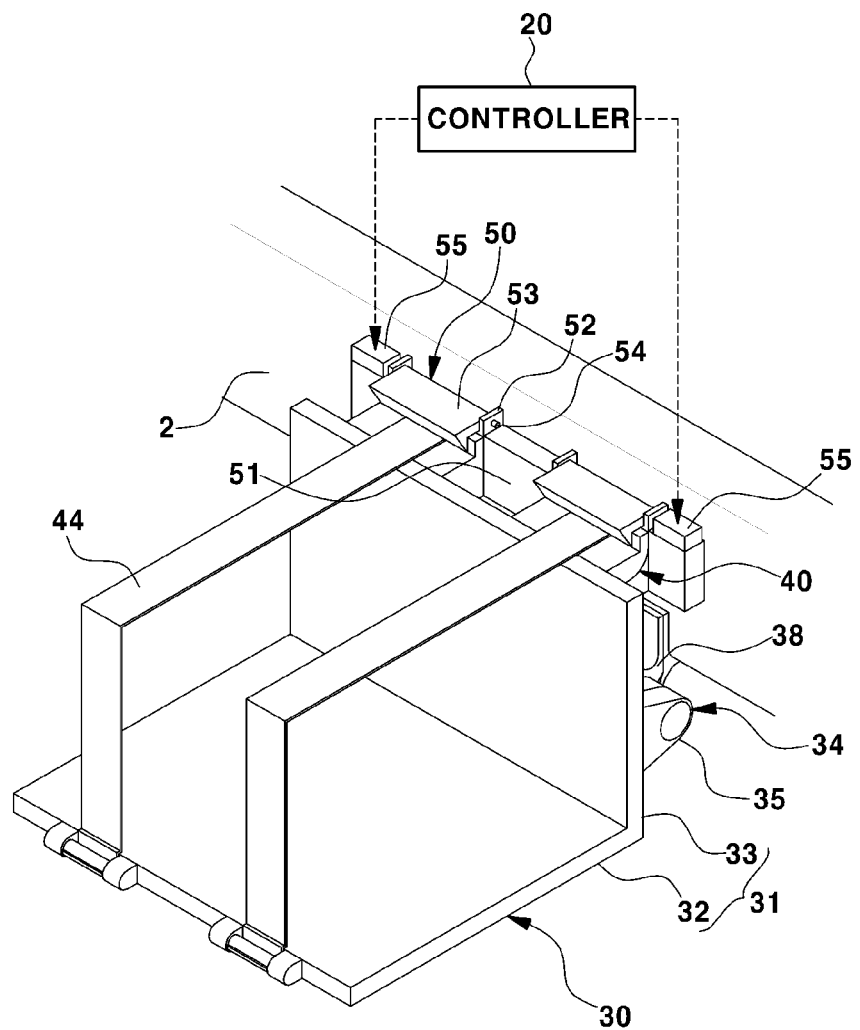
FIG. 7 is a perspective view illustrating a battery removal apparatus according to the present disclosure.
Figure 8:
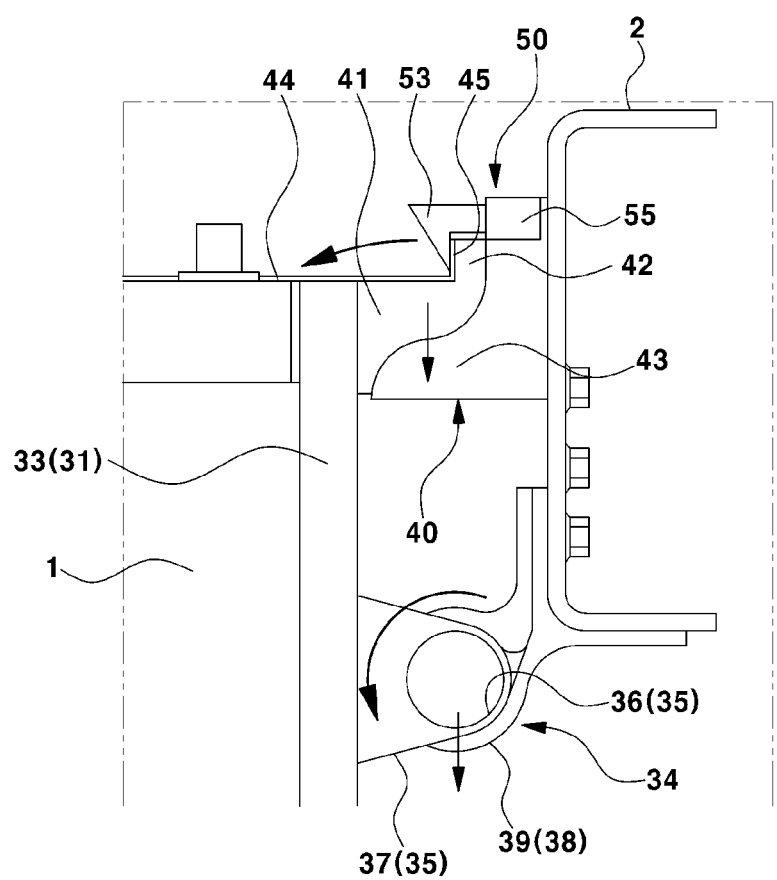
FIG. 8 is a side view illustrating a first mounting unit, a second mounting unit and hooks of the battery removal apparatus according to the present disclosure.

FIG. 7 is a perspective view illustrating the battery removal apparatus according to the present disclosure, and FIG. 8 is a side view illustrating a first mounting unit 34, a second mounting unit 40, and hooks of a locking device 50 of the battery removal apparatus according to the present disclosure.

FIG. 8 illustrates a state in which the battery 1 is mounted on the vehicle body frame 2 and a mounting structure 30 is locked by the locking device 50.

Figure 9:
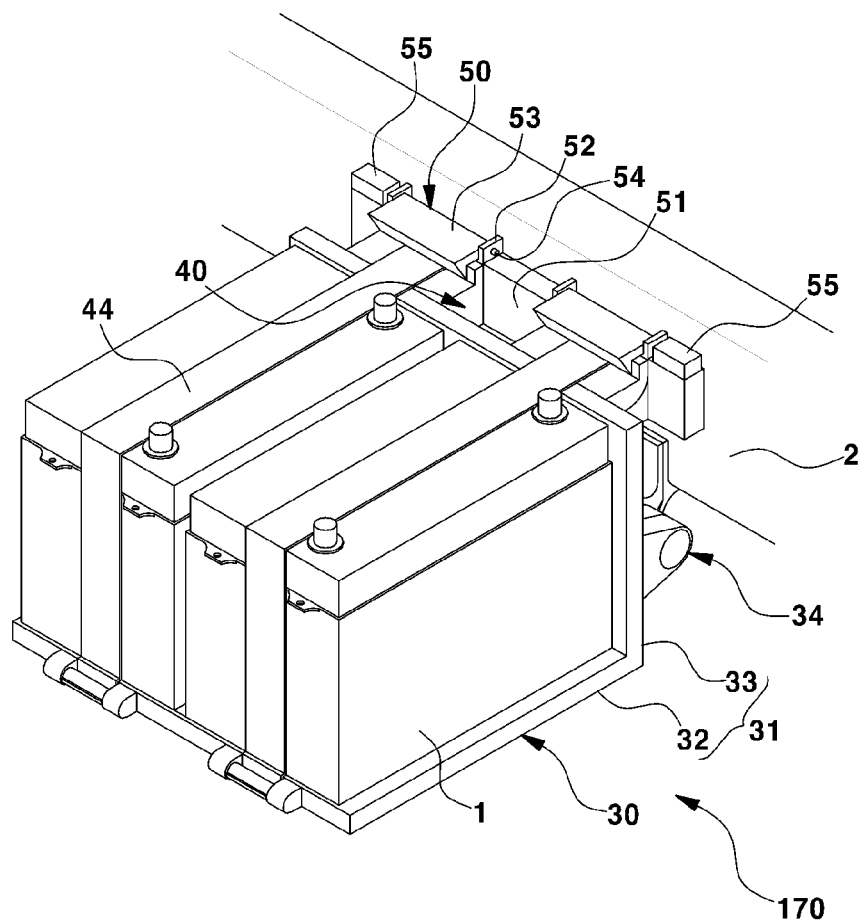
FIG. 9 is a perspective view illustrating a state in which the battery module is mounted on the vehicle body frame by the battery removal apparatus according to the present disclosure.
Figure 10:
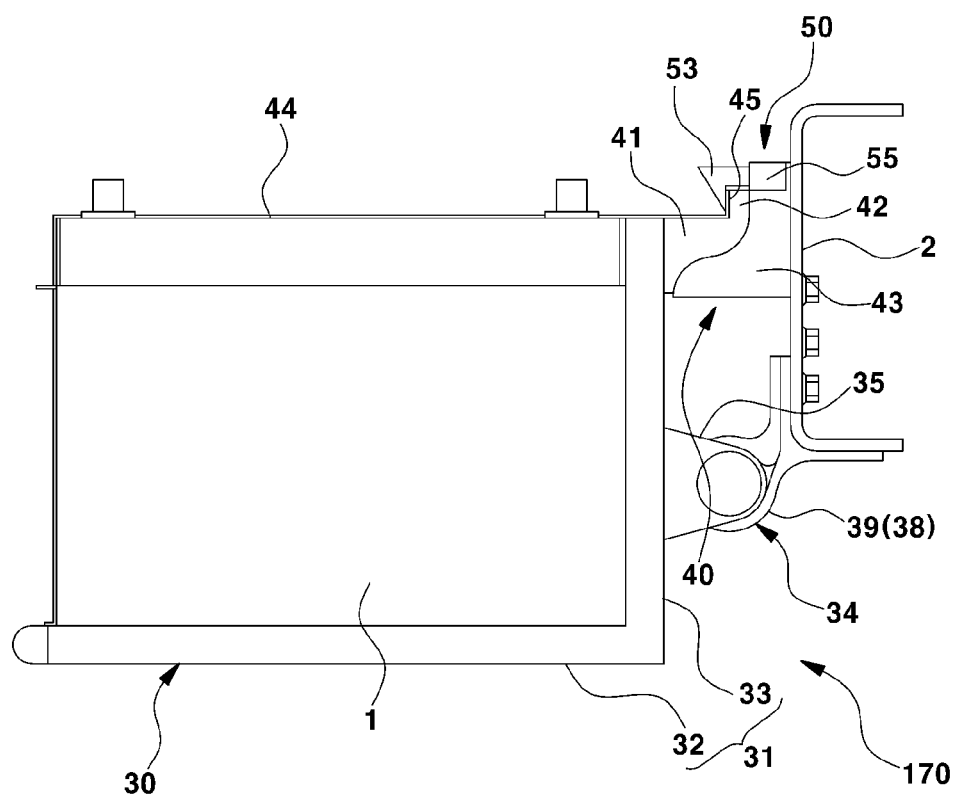
FIG. 10 is a side view illustrating the state in which the battery module is mounted on the vehicle body frame by the battery removal apparatus according to the present disclosure.

FIG. 9 is a perspective view illustrating a state in which the battery 1 is mounted on the vehicle body frame 2 by the battery removal apparatus according to the present disclosure, and FIG. 10 is a side view illustrating the state in which the battery 1 is mounted on the vehicle body frame 2.

Figure 11:
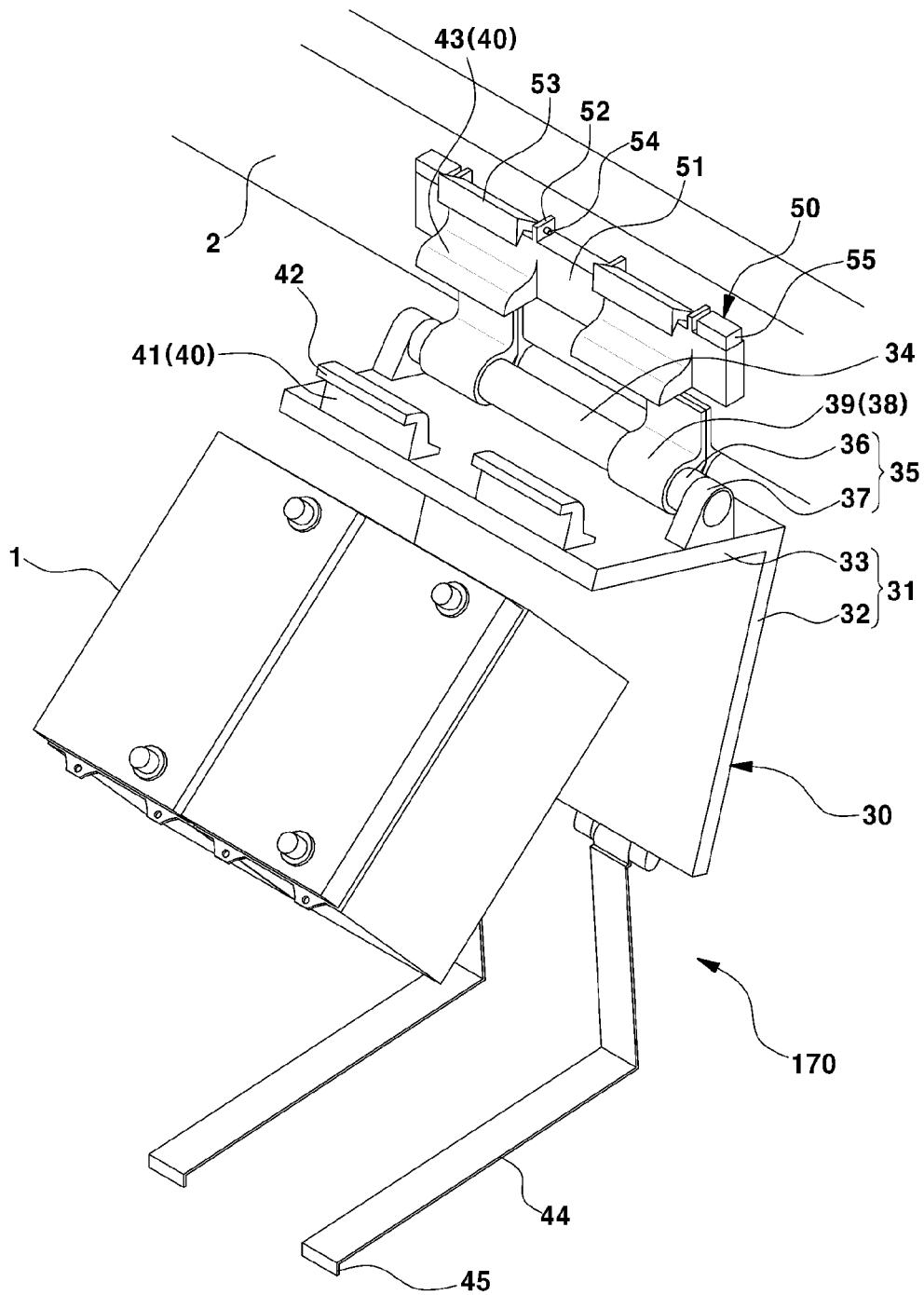
FIG. 11 is a perspective view illustrating the operating state of the battery removal apparatus according to the present disclosure for removing the battery.
Figure 12:
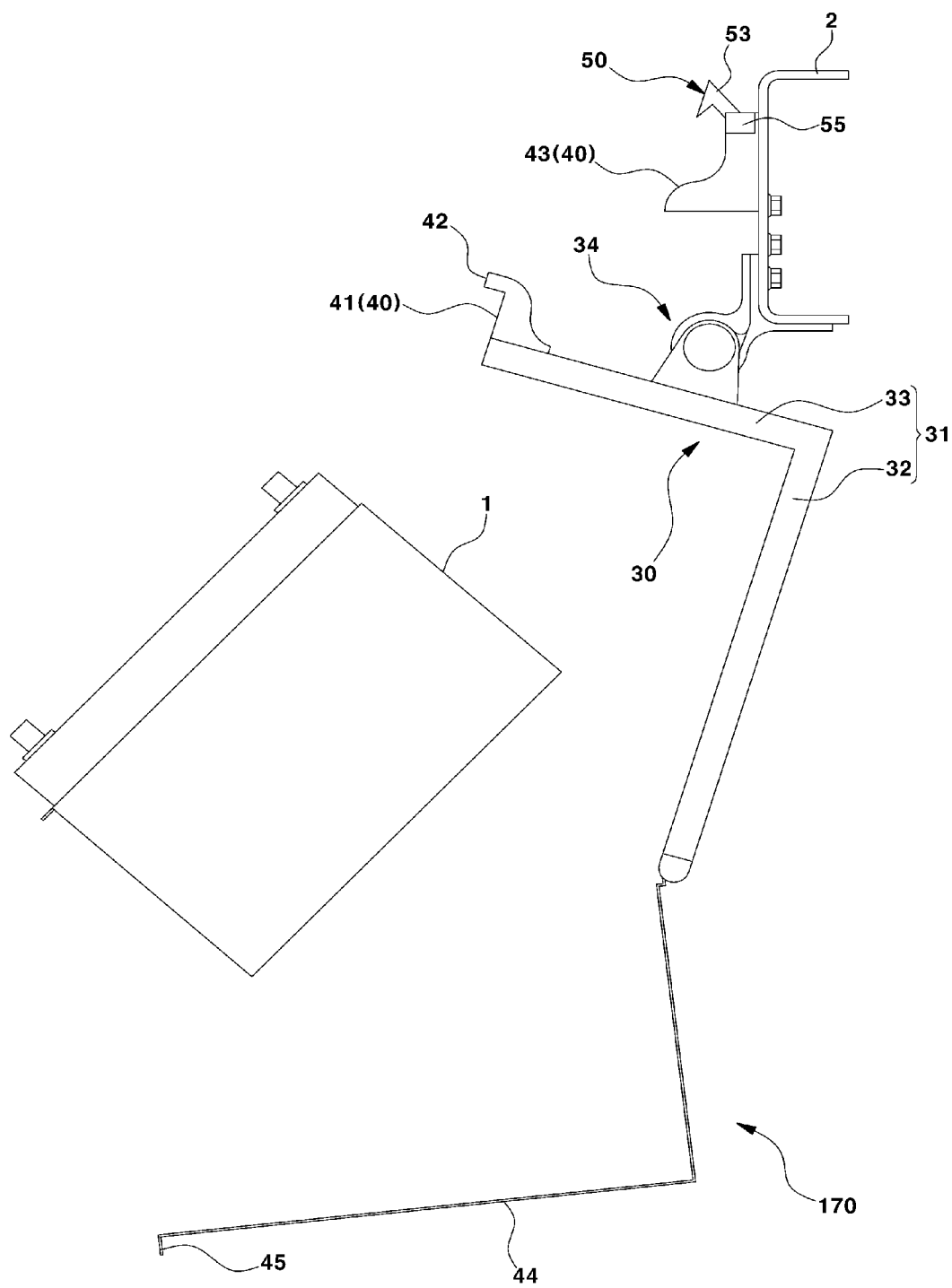
FIG. 12 is a side view illustrating the operating state of the battery removal apparatus according to the present disclosure for removing the battery.

FIG. 11 is a perspective view illustrating the operating state of the battery removal apparatus according to the present disclosure for removing the battery, and FIG. 12 is a side view illustrating the operating state of the battery removal apparatus according to the present disclosure for removing the battery.

In the present disclosure, the battery removal apparatus is configured to integrally perform a function of mounting the battery 1 on the vehicle body frame 2 and a function of releasing mounting of the battery 1 on the vehicle body frame 2 and removing the battery 1 so as to separate and discharge the battery 1 from the vehicle.

That is, in the present disclosure, the battery removal apparatus includes the mounting structure 30 configured to support and mount the battery 1 thereon and rotatably installed on the vehicle body frame 2 so as to remove the battery 1, and the locking device 50 installed on the vehicle body frame 2 to lock the mounting structure 30, configured to support the battery 1, onto the vehicle body frame 2 and operated to release locking of the mounting structure 30 onto the vehicle body frame 2 in response to a control signal from the controller 160 so as to perform removal of the battery 1.

Further, upon determining that a fire breaks out in the battery 1, the controller 160 outputs a control signal to remove the battery 1, and actuators 55 of the locking device 50 are operated so as to remove the battery 1 in response to the control signal from the controller 160.

In the present disclosure, the mounting structure 30 of the battery removal apparatus serves to mount the battery 1 on the side surface of the vehicle body frame 2, and includes a support 31 configured to support the battery 1 placed thereon and rotated to remove the battery 1 when locking of the mounting structure 30 by the locking device 50 is released, the first mounting unit 34 configured to rotatably couple the lower part of the support 31 to the vehicle body frame 2, and the second mounting unit 40 configured to fix the upper part of the support 31 to the vehicle body frame 2 in a locked state in which the mounting structure 30 is coupled to the locking device 50 and to release the fixed state of the support 31 to the vehicle body frame 2 when locking of the mounting structure 30 by the locking device 50 is released.

The support 31 is rotatably coupled to the vehicle body frame 2 via the first mounting unit 34 and mounted on the vehicle body frame 2 via the second mounting unit 40, and is configured such that the support 31 may be locked by the locking device 50 installed on the vehicle body frame 2 and locking of the support 31 by the locking device 50 may be released.

According to one embodiment of the present disclosure, the support 31 may be a plate-type support 31, as shown in FIG. 7, and in particular, may be an L-type support 31 in which a plate-type horizontal member 32 and a plate-type vertical member 33 are integrally connected.

The battery 1 is placed on the horizontal member 32 of the support 31, and the first mounting unit 34 and the second mounting unit 40 are installed on the vertical member 33.

Here, the first mounting unit 34 serves to rotatably couple and mount the lower part of the vertical member 33 to and on the vehicle body frame 2, and the second mounting unit 40 serves to couple the upper part of the vertical member 33 to the vehicle body frame 2 and the locking device 50.

If the support 31 is the above-described L-type support 31, the mounting structure 30 may further include straps 44 installed to surround the battery 1 mounted on the support 31, and the straps 44 connect the support 31 of the mounting structure 30 and the locking device 50.

According to an exemplary embodiment of the present disclosure, one end of each of the straps 44 is coupled to the front end of the support 31, particularly, the front end of the horizontal member 32 of the support 31, and the other end of each of the straps 44 together with the second mounting unit 40 of the mounting structure 30 is coupled to the locking device 50 such that the straps 44 are locked by the locking device 50 and locking of the straps 44 by the locking device 50 is released.

The straps 44 fix the battery to the support 31 in the locked state in which the straps 44 are coupled to the locking device 50, and are separated from the locking device 50 and thus release the fixed state of the battery 1 to the support 31 when locking of the straps 44 by the locking device 50 is released.

According to one embodiment of the present disclosure, a plurality of straps 44 may be installed to surround the battery 1, and all of the straps 44 surrounding the battery 1 may serve to fix the battery 1 placed on the support 31.

Although FIG. 7 exemplarily illustrates two straps 44, the present disclosure is not limited thereto and the number of straps 44 is variously changeable.

One end of each of the straps 44 is rotatably coupled to the front end of the support 31, particularly, the front end of the horizontal member 32 of the support 31, and each strap 44 may be provided in an L-type which is bent at a right angle at an intermediate portion thereof.

Further, an engagement end 45 which is engaged with the hooks 53 of the locking device 50 so as to be locked is formed at the other end of each of the straps 44, and the engagement end 45 is bent upwards from the other end of each of the straps 44.

In the mounting structure 30, the first mounting unit 34 may include a mounting member 35 installed on the rear surface of the lower part of the support 31, particularly, the rear surface of the lower part of the vertical member 33 of the support 31, and mounting brackets 38 fixedly installed on the vehicle body frame 2 and coupled to the mounting member 35.

In the first mounting unit 34, the mounting member 35 installed on the support 31 is rotatably coupled to the mounting brackets 38 installed on the vehicle body frame 2, and thereby, the entirety of the support 31 is rotatable about the mounting member 35 coupled to the vehicle body frame 2.

The mounting member 35 may serve as a hinge shaft which is the center of rotation of the support 31, and be formed as a shaft which extends in the leftward and rightward directions, i.e., in the lateral direction, and is installed on the rear surface of the lower part of the vertical member 33 of the support 31.

Here, the mounting member 35 includes a shaft part 36 having a cylindrical shape having a predetermined length or a rod shape having a circular cross-section and a predetermined length, and support parts 37 formed at both ends of the shaft part 36 and fixed to the rear surface of the vertical member 33 so as to support the shaft part 36 spaced apart from the rear surface of the vertical member 33.

The shaft part 36 extends in the leftward and rightward directions, i.e., in the lateral direction, and thus serves as a hinge shaft which is the center of rotation of the support 31.

Further, the mounting brackets 38 configured such that one side of each of the mounting brackets 38 is fixed to the vehicle body frame 2 and a circular coupling part 39 coupled to the mounting member 35 so as to surround the shaft part 36 of the mounting member 35 is formed at the other side of each of the mounting brackets 38.

One side of each of the mounting brackets 38 may be fixed to the vehicle body frame 2 by bolting or welding, and the shaft part 36 of the mounting member 35 may be provided so as to be rotatable inside the coupling parts 39 of the mounting brackets 38 by inserting the shaft part 36 of the mounting member 35 into the circular coupling parts 39.

According to one embodiment of the present disclosure, a plurality of mounting brackets 38 may be installed on the vehicle frame 2, and the shaft part 36 of the mounting member 35 extending horizontally may be inserted into the coupling parts 39 of the respective mounting brackets 38 so as to be rotatably coupled to the mounting brackets 38.

Referring to FIG. 11, two mounting brackets 38 are installed on the vehicle frame 2, and the shaft part 36 of the mounting member 35 installed on the support 31 is coupled to the two mounting brackets 38.

Although FIG. 11 exemplarily illustrates two mounting brackets 38, the present disclosure is not limited thereto and the number of mounting brackets 38 is variously changeable.

The first mounting unit 34 is a structure configured to withstand the weights of the support 31 and the battery 1 mounted on the support 31 in the direction of gravity, and serves to prevent movement of the support 31 in the leftward and rightward directions and in the upward and downward directions.

Further, the first mounting unit 34 serves to support the support 31 so as to be rotatable about the vehicle body frame 2, and allows the support 31 to be rotated downwards due to its own weight and the weight of the battery 1 when locking of the support 31 by the locking device 50 is released.

Here, rotation of the support 31 is performed as the shaft part 36 of the mounting member 35 is rotated within the coupling parts 39 of the mounting brackets 38.

The second mounting unit 40 includes mounted parts 41 installed on the rear surface of the upper part of the support 31, particularly, the rear surface of the upper part of the vertical member 33 of the support 31 so as to protrude rearwards, and bracket parts 43 fixed to the vehicle body frame 2 so as to support the mounted parts 41 placed thereon.

According to one embodiment of the present disclosure, a plurality of mounted parts 41 may be installed on the rear surface of the upper part of the vertical member 33, and more particularly, two mounted parts 41 may be installed at both sides of the vertical member 33 of the support 31, as exemplarily shown in FIG. 11.

An engagement protrusion 42 protruding upwards is formed at the front end of each mounted part 41, and the engagement protrusions 42 together with the engagement ends 45 of the straps 44 are engaged and locked onto the hooks 53 of the locking device 50.

The engagement protrusions 42 protrude perpendicularly upwards from the upper surfaces of the mounted parts 41, the engagement ends 45 of the straps 44 are bent perpendicularly from the ends of the straps 44, and thus, the engagement ends 45 of the straps 44 may overlap and be coupled to the engagement protrusions 42 of the mounted parts 41 under the condition that the engage ends 45 are held closely to the engagement protrusions 42.

Under the condition that the engagement ends 45 of the straps 44 overlap the engagement protrusions 42 of the mounted parts 41, the engagement protrusions 42 and the engagement ends 45, which overlap each other, are simultaneously engaged with the hooks 53 of the locking device 50, thereby being locked.

The bracket parts 43 are fixedly installed on the vehicle frame 2 and serve to support the mounted parts 41 of the support 31 mounted thereon from below, and, as shown in FIG. 11, a total of two bracket parts 43 may be installed, i.e., one bracket part 43 may be installed at each of both sides of the vehicle body frame 2.

According to one exemplary embodiment, the lower surfaces of the mounted parts 41 may be curved surfaces, and the upper surfaces of the bracket parts 43 may be curved surfaces to which the lower surfaces of the mounted parts 41 correspond (match).

Referring to FIGS. 8 and 10, the lower surfaces of the mounted parts 41 and the upper surfaces of the bracket pars 43 may be curved surfaces having wave-shaped cross-sections, and thereby, when the lower surfaces of the mounted parts 41 are placed on the upper surfaces of the bracket part 43, larger areas of the curved surfaces thereof may contact each other as compared to the case in which the lower surfaces of the mounted parts 41 and the upper surfaces of the bracket part 43 are flat surfaces.

As shown in FIGS. 8 and 10, since the lower surfaces of the mounted parts 41 and the upper surfaces of the bracket parts 43 adhered to each other are curved surfaces having wave-shaped cross-sections, when the mounted parts 41 are mounted on the bracket parts 43, the mounted parts 41 may be stably supported by the bracket parts 43 and the second mounting unit 40 may ensure mounting strength sufficient to withstand the weights of the support 31 and the battery 1.

Further, when locking of the support 31 by the locking device 50 is released and thus the support 31 is rotated, the mounted parts 41 may be easily and smoothly separated from the upper surfaces of the bracket parts 43 without interference.

Thereby, in the present disclosure, the support 31 may be stably supported by and mounted on the first mounting unit 34 located at the lower part of the vehicle body frame 2 and the second mounting unit 40 located at the upper part of the vehicle body frame 2, and the first mounting unit 34 and the second mounting unit 40 may ensure sufficient mounting strength and allow the support 31 to be smoothly rotated without interference when locking of the support 31 by the locking device 50 is released, thereby being capable of reliably removing the battery 1.

The configuration of the mounting structure 30 has been described above, and hereinafter, the locking device 50 will be described in more detail.

The locking device 50 is installed on the vehicle body frame 2, and serves to lock and fix the mounting structure 30 supporting the battery 1 to the vehicle body frame 2. The locking device 50 fixes the mounting structure 30 to the vehicle body frame 2, thereby maintaining the mounted state of the battery 1 on the vehicle body frame 2 by the mounting structure 30.

Therefore, the battery removal apparatus according to the present disclosure performs both a function of removing the battery 1 when a fire breaks out and a function of mounting and fixing the battery on and to the vehicle body frame 2 through the mounting structure 30 and the locking device 50 in normal times.

Further, the locking device 50 is operated to release locking of the mounting structure 30 in response to a control signal from the controller 160.

When locking of the mounting structure 30 by the locking device 50 is released, the mounting structure 30 supporting the battery 1, particularly, the support 31 of the mounting structure 30 supporting the battery 1 is rotated downwards, as described above, and thus, the battery 1 may be removed from the support 31.

According to one embodiment of the present disclosure, the locking device 50 configured to lock the mounting structure 30 or to release locking of the mounting structure 30 includes the hooks 53 rotatably installed on the vehicle body frame 2 so as to lock the engagement protrusions 42 installed on the mounting structure 30, and the actuators 55 fixedly mounted on the vehicle body frame 2 so as to forcibly rotate the hooks 53 maintained in the locked state thereof to a lock release position.

According to one exemplary embodiment, the hooks 53 may be rotatably coupled to a back bracket 51 fixed to the vehicle body frame 2, and the actuators 55 may also be fixedly mounted on the base bracket 51.

That is, the hooks 53 and the actuators 55 are installed on the vehicle body frame 2 via the base bracket 51.

Further, the base bracket 51 may be provided integrally with the bracket parts 43 of the second mounting unit 40, and one bracket part 43 may protrude forwards from each of both sides of the front surface of the base bracket 51, i.e., a total of two bracket parts 43 may be formed, as exemplarily shown in FIG. 11.

In addition, the hooks 53 configured to lock the engagement protrusions 42 formed on the mounted parts 41 of the second mounting unit 40 may be rotatably installed at the upper part of the base bracket 51, and one hook 53 may be installed at each of both sides of the base bracket 51, i.e., a total of two hooks 53 may be installed.

As such, the hooks 53, the mounted parts 41 and the bracket parts 43 are installed in the same number, one hook 53, one mounted part 41 and one bracket part 43 may be installed at each of both sides of the base bracket 51 so that two hooks 53, two mounted parts 41 and two bracket parts 43 may be installed, and the base bracket 51, the hooks 53, the actuators 55 and the bracket parts 43 may be modularized so as to be simultaneously mounted on the vehicle body frame 2.

Each hook 53 extends so as to have a predetermined length, and is disposed to extend along the upper part of the base bracket 51, and a hinge shaft 54 protruding from both ends of each hook 53 are rotatably coupled to supports 52 protruding from the upper part of the base bracket 51.

Under the condition that the respective hooks 53 are rotated downwards about the hinge shafts 54, the hooks 53 hold both the engagement protrusions 42 of the mounting structure 30, i.e., the engagement protrusions 42 protruding upwards from the mounted parts 41 of the second mounting unit 40, and the engagement ends 45 of the straps 44, thereby locking the mounting structure 30.

On the other hand, under the condition that the hooks 53 lock the mounting structure 30, when the hooks 53 are forcibly rotated upwards about the hinge shafts 54 so as to be separated from the engagement protrusions 42, the hooks 53 release locking of the mounting structure 30.

One actuator 55 may be installed at each of the hooks 53, and the actuator 55, which is fixedly installed at the upper part of the back bracket 51, is connected to the corresponding hook 53 so as to transmit force to the hook 53.

According to one embodiment of the present disclosure, the actuator 55 may be a motor, driving of which is controlled in response to a control signal from the controller 160, and more particularly, a servomotor.

Here, the driving shaft of the motor 55 may be connected to the hinge shaft 54 of the hook 53 and, when the motor 55 is driven, the rotating force of the motor 55 may be transmitted to the hinge shaft 54 of the hook 53 and thus rotate the hook 53.

The motor 55 is driven by the controller 10 which determines that a fire breaks out in the battery 1, and forcibly rotates the hook 53 in the lock release direction, thereby releasing the state in which the mounting structure 30 is locked onto the vehicle body frame 2.

As such, when the locked state of the mounting structure 30 is released, the support 31 of the mounting structure 30 supporting the battery 1 is rotated downwards about the first mounting unit 34 by its own weight and the weight of the battery 1, and thereafter, the battery 1 may be removed downwards from the mounting structure 30 by its own weight.

Because the battery 1 is heavy, when the support 31 of the mounting structure 30 supporting the battery 1 is rotated downwards, the battery 1 may be automatically removed and thus fall down to the ground and, at this time, accessories and parts, such as electric wires connected to the battery 1, may be automatically separated from the battery, or be removed together with the battery 1 under the condition that the accessories and the parts remain connected to the battery 1.

The configuration of the battery removal apparatus and the operating state thereof according to the present disclosure has been described above, and hereinafter, the operating state of the battery removal apparatus will be summarized in more detail.

First, the controller 160 outputs a control signal for removing the battery 1.

Thereafter, the actuators 55, i.e., the servomotors 55, of the locking device 50 are driven in response to the control signal and thus forcibly rotate the hooks 53 upwards, thereby releasing the locked state of the mounting structure 30.

Here, the engagement ends 45 of the straps 44 are separated from the hooks 53 and simultaneously the engagement protrusions 42 of the mounting structure 30 are also separated from the hooks 53, and consequently, the support 31 is rotated downwards about the first mounting unit 34 due to the weight of the battery 1 and thus the battery 1 is removed from the support 31.

When the battery 1 which is on fire is removed and discharged from the vehicle, as described above, the vehicle may move away from a battery removal place by driving the drive motor 200 using the power of another battery which is not on fire.

When the vehicle moves away from the battery removal place, the vehicle and the battery are completely spatially separated from each other, thereby being capable of preventing the battery fire from spreading throughout the vehicle and safely protecting the vehicle, the driver and passengers from the fire.

After discharging the battery which is on fire, the vehicle may move away from the battery removal place by driving the drive motor 200 using the power of a separate battery which is not on fire, i.e., the subsidiary battery or a battery module which is not on fire among the two battery modules shown in FIG. 6.

As is apparent from the above description, a fire spreading prevention system for vehicles according to the present disclosure, upon determining that a fire breaks out in a battery of a vehicle, moves the vehicle to a battery removal feasible place satisfying predetermined conditions, and then operates a battery removal apparatus so as to remove the battery from the vehicle and to discharge the battery, thereby preventing the battery fire from spreading throughout the vehicle and preventing complete combustion of the vehicle and loss of life.

Particularly, after removing the battery from the vehicle and discharging the battery to the outside of the vehicle, the fire spreading prevention system according to the present disclosure moves the vehicle to a safe space away from a battery removal place, thereby safely protecting the vehicle.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A fire spreading prevention system for a vehicle, comprising:
    a battery state detector configured to detect battery state information for sensing a battery fire in the vehicle;
    a controller configured to output a control signal for removing a battery upon determining that the battery fire breaks out using the battery state detector; and
    a battery removal apparatus installed in the vehicle to fix the battery to a vehicle body, and configured to release the battery from the vehicle body and simultaneously to remove the battery from the vehicle in response to the control signal from the controller so that the battery is separated and removed to an outside of the vehicle so as to be spatially separated from the vehicle,
    wherein the battery removal apparatus comprises:
        a mounting structure rotatably installed on a vehicle body frame, configured to support the battery thereon, and rotated from the vehicle body frame due to a weight of the battery when the battery is removed; and
        a locking device installed on the vehicle body frame to lock the mounting structure configured to support the battery and thus to fix the mounting structure to the vehicle body frame, and operated to release locking of the mounting structure in response to the control signal from the controller so as to rotate the mounting structure and to remove the battery, and
    wherein the locking device comprises:
        hooks rotatably installed on the vehicle body frame so as to lock engagement protrusions formed on the mounting structure; and
        actuators fixedly installed on the vehicle body frame so as to forcibly rotate the hooks maintained in a locked state thereof to a lock release position.

2. The fire spreading prevention system of claim 1, further comprising:
    a driving information input unit configured to detect or provide vehicle driving information; and
    a peripheral information input unit configured to detect or provide information about surroundings of the vehicle,
    wherein the controller determines whether or not the battery fire breaks out, a battery removal place, and whether or not to remove the battery based on the vehicle driving information, the battery state information and the information about the surroundings of the vehicle, and
    wherein the controller outputs the control signal for removing the battery when a current vehicle position is the battery removal place and based on the vehicle driving information, the battery state information and the information about the surroundings of the vehicle, upon determining that the battery fire breaks out.

3. The fire spreading prevention system of claim 2, wherein the driving information input unit comprises:
    a vehicle speed detector configured to detect a current vehicle speed; and
    a speed change detector configured to detect vehicle transmission information,
    wherein the controller is configured to remove the battery upon determining that the vehicle is in a stopped state based on the vehicle speed detected by the vehicle speed detector and determining that a current gear position of a transmission is a gear position P or N based on the vehicle transmission information detected by the speed change detector.

4. The fire spreading prevention system of claim 2, wherein the vehicle driving information comprises, when a fire breaks out in at least one of a plurality of batteries mounted in the vehicle, a drivable distance that the vehicle is capable of being driven using power of a battery which is not on fire, wherein the controller:
  determines to remove the battery from the vehicle based on the vehicle driving information, the battery state information and the information about the surroundings of the vehicle, when the drivable distance is equal to or greater than a set distance; and
  operates the battery removal apparatus so as to separate and remove the at least one battery in which the fire breaks out to the outside of the vehicle, and then drives a drive motor using the power of the battery which is not on fire so as to move the vehicle away from a battery removal place.

5. The fire spreading prevention system of claim 2, wherein the peripheral information input unit comprises:
  a camera mounted in the vehicle to capture the surroundings of the vehicle; and
  an object detector mounted in the vehicle to detect objects near the vehicle,
  wherein the controller determines to remove the battery from the vehicle based on the vehicle driving information, the battery state information and the information about the surroundings of the vehicle, upon determining that objects comprising vehicles and persons are not present within a designated distance near the vehicle based on the information about the surroundings of the vehicle acquired by the camera and the object detector.

6. The fire spreading prevention system of claim 2, wherein the peripheral information input unit comprises:
  a navigation system installed inside the vehicle; and
  an external system located outside the vehicle so as to wirelessly provide information about buildings and roads near the vehicle, peripheral vehicle information and traffic information,
  wherein the controller determines whether or not a current position of the vehicle is the battery removal place satisfying predetermined conditions based on the information about the surroundings of the vehicle provided by the navigation system and the external system located outside the vehicle, upon determining that the battery fire breaks out.

7. The fire spreading prevention system of claim 6, wherein the controller:
  upon determining that the current position of the vehicle is not the battery removal place satisfying the predetermined conditions based on the information about the surroundings of the vehicle provided by the navigation system and the external system, searches for and determines another battery removal place satisfying the predetermined conditions based on the information about the surroundings of the vehicle; and
  sets the determined battery removal place to a destination through the navigation system, and controls the navigation system to perform path guidance so as to move the vehicle to the destination or perform autonomous driving control of the vehicle so as to move the vehicle to the destination.

8. The fire spreading prevention system of claim 7, wherein the controller uses, when a drive motor configured to move the vehicle to the destination is driven, power of a battery which is not on fire, configured to be separately mounted in the vehicle, to drive the drive motor.

9. The fire spreading prevention system of claim 6, wherein the predetermined conditions used to determine the battery removal place comprise:
  a condition in which the vehicle is located on a side road or in a vacant lot; and
  a condition in which the vehicle is not located in a child protection zone, an elderly protection zone, a two-lane road with one lane for each direction, an expressway service area, a rest area, an alleyway, a road having no lane and traffic signal information, or a residential area.

10. The fire spreading prevention system of claim 1, wherein the controller performs autonomous driving control of the vehicle so as to move the vehicle to a place spaced apart from a battery removal place by a predetermined distance using power of a battery which is not on fire, configured to be separately mounted in the vehicle, under a condition that the battery is separated and removed to the outside of the vehicle by operating the battery removal apparatus upon determining that the battery fire breaks out.

11. The fire spreading prevention system of claim 1, wherein the battery state detector comprises:
  a temperature sensor configured to detect a temperature (° C.) of battery cells; and
  a strain gauge configured to measure a strain rate of the battery cells.

12. The fire spreading prevention system of claim 1, further comprising an interface of the vehicle configured to allow a driver to input one selected from turning-on or turning-off of a battery removal function,
  wherein the controller outputs the control signal for removing the battery when an ON signal of the battery removal function is input from the interface, upon determining that the battery fire breaks out.

13. The fire spreading prevention system of claim 1, further comprising a mobile terminal configured to allow a driver to input one selected from turning-on or turning-off of a battery removal function,
  wherein the controller outputs the control signal for removing the battery when an ON signal of the battery removal function is received from the mobile terminal wirelessly, upon determining that the battery fire breaks out.

14. The fire spreading prevention system of claim 1, wherein the mounting structure comprises:
  a support configured to support a battery pack thereon and rotated to remove the battery pack when locking of the mounting structure by the locking device is released;
  a first mounting unit configured to rotatably couple a lower part of the support to the vehicle body frame; and
  a second mounting unit configured to fix an upper part of the support to the vehicle body frame in a locked state, in which the mounting structure is coupled to the locking device, and to release a fixed state of the support to the vehicle body frame when locking of the mounting structure by the locking device is released.

15. The fire spreading prevention system of claim 14, wherein the mounting structure comprises:
  straps configured to connect the support and the locking device, installed to surround the battery pack so as to fix the battery pack to the support in the locked state, in which the mounting structure is coupled to the locking device, and separated from the locking device to release a fixed state of the battery pack to the support when locking of the mounting structure by the locking device is released.

16. The fire spreading prevention system of claim 14, wherein the second mounting unit comprises:
  mounted parts installed on a rear surface of the upper part of the support so as to protrude rearwards, and coupled to the locking device so as to be locked onto the locking device; and bracket parts installed to be fixed to the vehicle body frame so as to support the mounted parts placed thereon.

17. The fire spreading prevention system of claim 16, wherein an engagement protrusion configured to be engaged with a hook of the locking device is formed at each of the mounted parts, and the engagement protrusions of the mounted parts are engaged with the hooks of the locking device so as to lock the mounted parts onto the locking device.

* * * * *